UNITED STATES PATENT OFFICE 2,220,963

AZO DYESTUFFS

Arthur Howard Knight, Blackley, Manchester, England, assignor to Imperial Chemical Industries Limited, a corporation of Great Britain No Drawing. Application March 29, 1939, Serial No. 264,845. In Great Britain April 4, 1938

7 Claims. (Cl. 260—205)

This invention relates to new blue monazo dyestuffs and to methods on manufacturing the same.

In British specification No. 430,079 there is described a process for the manufacture of water-soluble azo dyestuffs suitable for the dyeing and printing of acetate artificial silk and other materials, which comprises coupling diazotized 6-chloro-2:4-dinitroaniline or diazotized 6-bromo-2:4-dinitroaniline with an N-sulphatoethyl or N-alkyl-N-sulphatoethyl derivative of an amine of benzene which is adapted to couple in the para position to the amino group and in which the term alkyl signifies methyl, ethyl, propyl, or butyl.

It is among the objects of the present invention to provide monazo dyestuffs suitable for printing and dyeing acetate artificial silk which have good solubility, washing fastness, dischargeability and improved fastness to light over dyes having somewhat similar structures. Another object of the invention is to provide dyes having such improved light fastness in shades which are bluer than other dyes having somewhat similar structures.

According to the present invention we manufacture new water-soluble dyestuffs suitable for the dyeing or printing of cellulose acetate artificial silk by combining diazotized 6-chloro- or 6-bromo-2:4-dinitroaniline with a coupling component represented by the formula

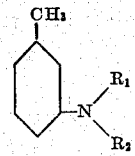

in which $R_1$ is alkyl (methyl to butyl) and $R_2$ is a sulphatoethyl group. Alternatively, and also according to the present invention, we manufacture the new dyestuffs by treating the water-insoluble dyestuffs, obtained by combining diazotized 6-chloro- or 6-bromo-2:4-dinitroaniline with a coupling component of the general formula

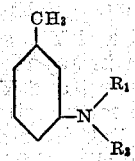

wherein $R_1$ is the same as before and $R_3$ is a hydroxyethyl group, with an agent adapted to give their sulphuric esters, as for example sulphuric acid.

The dyestuffs of the present invention have very good solubility in hot water, good fastness properties and are dischargeable. They are eminently suitable for the printing of acetate artificial silk.

Moreover, they are valuable for the dyeing of wool, natural silk, tin-weighted silk and leather. They yield colourations on acetate artificial silk which are faster to light than those given by the dyestuffs of the above-mentioned specification which dye in similar shades and are bluer in shade than dyestuffs which are somewhat similar in constitution but do not have halogen in the azo component.

The invention is illustrated, but not limited, by the following examples in which the parts are by weight:

Example 1

6.9 parts of sodium nitrite are added to 150 parts of 100% sulphuric acid and stirred until no solid remains. 21.8 parts of 6-chloro-2:4-dinitroaniline are added to the solution so-obtained with stirring in 1½–2 hours. After stirring for a short time longer the resulting solution is heated to 50–55° C. and kept at that temperature for 2 hours. It is then cooled to 20–25° C., and added slowly with stirring to a solution (containing ice) of 30.9 parts of the sodium salt of N-n-butyl-N-sulphatoethyl-m-toluidine (which may be also called N-n-butyl-N-β-hydroxyethyl-m-toluidine sulphuric ester) in 400 parts of water containing 13.6 parts of sodium acetate. Ice is added from time to time to keep the temperature of the coupling medium at or below 0° C., and 40% aqueous sodium hydroxide solution is gradually added at such a rate that the coupling medium is kept just acid to Congo red paper. When all the sulphuric acid solution has been added the suspension of the new dyestuff so-obtained is made alkaline with sodium hydroxide, stirred for some time to complete the conversion of the dyestuff into its sodium salt and then the dyestuff is filtered off and dried. If necessary, the wet dyestuffs paste can be lixiviated with water or 5% aqueous sodium chloride solution to remove adhering sodium sulphate before drying.

The new dyestuff forms a dark brown powder which dissolves in hot water with a bluish-violet color and in concentrated sulphuric acid with a yellowish-red color. It dyes acetate artificial silk in bluish-violet shades of very good light fastness from a neutral or alkaline dyebath containing 1% of sodium chloride. The colorations are readily dischargeable. It is also eminently suitable for printing acetate artificial silk.

The compound is represented by the formula

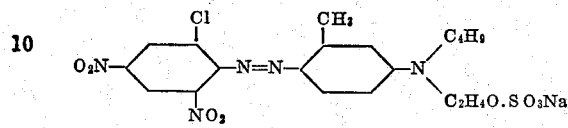

If in the above example instead of 21.8 parts of 6-chloro-2:4-dinitroaniline there are used 26.2 parts of 6-bromo-2:4-dinitroaniline a dyestuff of similar improved properties is obtained which dyes acetate artificial silk in similar bluish-violet shades of good fastness properties and good dischargeability.

*Example 2*

43.5 parts of the water-insoluble monoazo compound 6-chloro-2:4-nitroaniline→N-n-butyl-N-β-hydroxyethyl-m-toluidine which is represented by the formula.

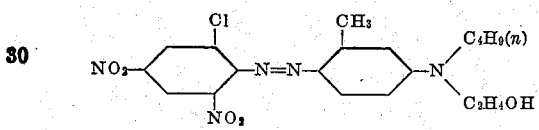

are ground to a powder and added in small portions to 200 parts of concentrated sulphuric acid at 15°–25° C., with stirring. Stirring is continued until sulphation is complete. The latter is determined by adding a small test-portion of the sulphuric acid solution to ice, filtering off the precipitated product to remove the acid liquor and resuspending it in water. The suspension is then made alkaline with sufficient sodium carbonate to form the sodium salt of the acid. If, on warming, the product passes completely into solution, then sulphation is complete.

When sulphation is complete the resulting sulphuric acid solution is poured on to ice and the new dyestuff which is precipitated is filtered off, resuspended in 500 parts of water, 25 parts of sodium chloride are added, and the suspension made alkaline with aqueous sodium hydroxide solution to convert the dyestuff into its sodium salt. The latter is then filtered off, washed with a little 5% aqueous sodium chloride solution and dried.

The resulting dyestuff possesses similar reactions, shade, dyeing and fastness properties to those given by the first dyestuff of Example 1 and is believed to be identical in constitution with that dyestuff.

If in the above example, instead of 43.5 parts of the monoazo compound 6-chloro-2:4-dinitroaniline→N-n-butyl-N - β - hydroxyethyl -m-toluidine there are used 48 parts of the monoazo compound 6-bromo-2:4-dinitroaniline→N-n-butyl-N-β-hydroxyethyl-m-toluidine a water-soluble dyestuff is obtained which is believed to be identical in constitution with that mentioned at the end of Example 1.

*Example 3*

21.8 parts of 6-chloro-2:4-dinitroaniline are diazotized by the method described in Example 1 and the diazo compound so-obtained coupled with 28.1 parts of the sodium salt of N-ethyl-N-sulphatoethyl-m-toluidine by the procedure described in Example 1 for N-n-butyl-N-sulphatoethyl-m-toluidine. The new dyestuff is isolated in a similar manner to that for the dyestuff of Example 1. It dyes acetate artificial silk in bluish-violet shades which are a little redder than those obtained with the dyestuffs of Example 1 and which have similar properties as regards fastness and dischargeability.

*Example 4*

26.2 parts of 6-bromo-2:4-dinitroaniline are diazotized by the method described in Example 1 for 6-chloro-2:4-dinitroaniline and coupled with 29.5 parts of the sodium salt of N-isopropyl-N-sulphatoethyl-m-toluidine by the procedure described in Example 1 for N-n-butyl-N-sulphatoethyl-m-toluidine. The dyestuff is isolated in the form of its sodium salt by the method described for the dyestuffs of Example 1. It dyes acetate artificial silk from a neutral dyebath containing 1% of sodium chloride in bluish-violet shades of good fastness properties and dischargeability.

Instead of the N-alkyl-N-sulfatoethyl-m-toluidines or the N-n-alkyl-n-β-hydroxyethyl-m-toluidines, any of the corresponding tertiary meta toluidines can be used in which alkyl is a branched or straight chain alkyl group having one to four carbons, such as those in which alkyl is methyl, propyl or isobutyl. In forming the soluble products of the sulfato compounds described, any alkali metal or ammonium compound capable of forming an alkali metal salt can be used instead of sodium hydroxide, such as sodium carbonate, potassium hydroxde or ammonium hydroxide.

Having now particularly described and ascertained the nature of my said invention and in what manner the same is to be performed, I declare that what I claim is:

1. A compound represented by the formula

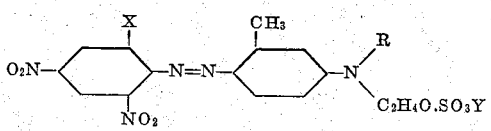

in which X is one of a group consisting of chloro and bromo, R is one of a group consisting of straight and branched chain alkyl radicals having 1 to 4 carbons, and Y is one of a group consisting of alkali metals and ammonia.

2. A compound represented by the formula

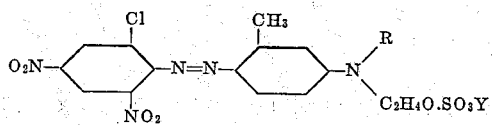

in which R is one of a group consisting of straight and branched chain alkyl radicals having one to four carbons, and Y is one of a group consisting of alkali metals and ammonia.

3. The compound in accordance with claim 2 in which R is butyl and Y is sodium.

4. The compound in accordance with claim 2 in which R is ethyl and Y is sodium.

5. The compound in accordance with claim 2 in which R is isopropyl and Y is sodium.

6. Process in the manufacture of new water-soluble dyestuffs suitable for dyeing and printing acetate artificial silk, which comprises treating the water-insoluble dyestuffs, obtained by coupling one of a group consisting of diazotized 6-chloro- and 6-bromo-2:4-dinitroaniline with a coupling component of the general formula

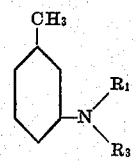

in which $R_1$ is one of a group consisting of straight and branched chain alkyl radicals having one to four carbons and $R_3$ is hydroxy ethyl, with an agent adapted to give the sulphuric esters of said compounds.

7. The process which comprises adding in small portions to an excess of concentrated sulfuric acid a powder of an insoluble monazo compound represented by the formula

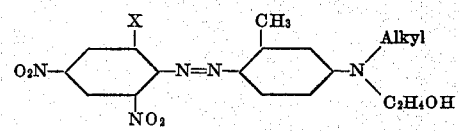

in which X is one of a group consisting of chloro and bromo and alkyl is one of a group consisting of straight and branched chain alkyl radicals having one to four carbons; agitating the mixture at 15° to 25° C. and sulfating until a product is formed which is insoluble in water but whose sodium salt is soluble in warm water.

ARTHUR HOWARD KNIGHT.

CERTIFICATE OF CORRECTION.

Patent No. 2,220,963. November 12, 1940.

ARTHUR HOWARD KNIGHT.

It is hereby certified that error appears in the printed specification of the above numbered patent requiring correction as follows: Page 1, first column, line 2, for "oh" read --of--; page 2, second column, line 71, claim 6, for "in" read --for--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.